Dec. 13, 1932.         S. RUBEN            1,891,206
              POLARIZED ELECTROLYTIC COUPLE
              Original Filed June 22, 1927
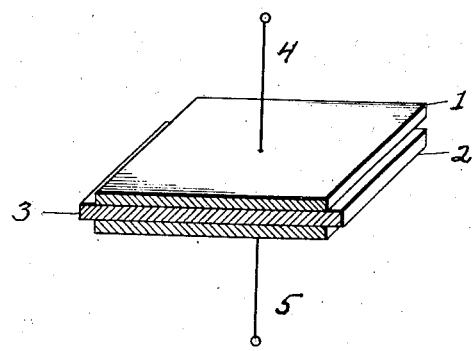
Inventor
SAMUEL RUBEN
By his Attorney Patented Dec. 13, 1932

1,891,206

UNITED STATES PATENT OFFICE

SAMUEL RUBEN, OF NEW ROCHELLE, NEW YORK, ASSIGNOR, BY MESNE ASSIGNMENTS, TO RUBEN CONDENSER COMPANY, OF NEW ROCHELLE, NEW YORK, A CORPORATION OF DELAWARE

POLARIZED ELECTROLYTIC COUPLE

Application filed June 22, 1927, Serial No. 200,753. Renewed November 17, 1931.

This invention relates to polarized electrolytically conductive couples, and more particularly it relates to couples of the electrolytic cell type, adapted especially for use as lightning arresters.

The object of the invention is the provision of an electrical couple of this type that is low in cost of construction and highly efficient.

For many industrial applications, it is important to have a device affording protection of electrical circuits against the effects of transient discharges of abnormal frequency and potentials of abnormal values.

While this couple is applicable to the various uses to which couples of this type are applied, it is for use as a lightning arrester that the device of my invention is especially designed. For practical uses it is desirable to operate a plurality of these devices arranged in series when an equal distribution of potential through the elements must be maintained, especially where used for the protection of power circuits. In devices of the electrolytic cell type, provision should be made for the maintenance of the dielectric film electrolytically formed on the electrode surfaces. In lightning arresters of the prior art employing fluid electrolytes this important factor is not present.

In the device of my invention I employ film-forming metal electrodes contacting with a spacer with a film-maintaining layer of a crystalized electrolyte, the spacer being composed of a cellulose material, such as paper, which is thoroughly impregnated with and suspends the crystal electrolyte. The electrolyte used in the device particularly described is a crystal mixture of boric acid crystals and borax crystals with a small amount of glycerin and water in a somewhat plastic state. Although the specific example of the electrolyte used in the present invention includes borax crystals as the salt other salts of the acid used, such as, for example, boric acid, can be used in carrying out the present invention. Examples of such salts are ammonium borate and potassium borate.

Two electrode plates, having therebetween a spacer of absorptive paper or a reticular body such as a cloth, are immersed in a molten solution at about 200° F. of a mixture of boric acid crystals, borax crystals and glycerin, the glycerin being added to facilitate the impregnation of the spacer, a vacuum being then applied when the occluded gases are exhausted, the mixture completely impregnating the spacer material. So treated, the device has a relatively low electrical resistance.

When the device has been allowed to dry and cool, a potential is applied to the electrodes to effect the formation of a resistance film at the electrolyte contact with the anode. The electrostatic capacity of this couple at 12 volts is about .5 microfarads per square centimeter of contacting area.

For the impregnating crystallized electrolyte, I prefer a mixture of substantially the following composition: by weight, 12 parts borax crystals, 10 parts boric acid crystals, 4 parts water and 1 part glycerin. This mixture is practically in a solid form at normal temperature.

For the electrodes aluminum is preferred because of its electropositive character and the high decomposition potential of its compound and its relatively low cost; other electropositive materials, however, such as magnesium, can be employed. With magnesium, a crystallized electrolyte of potassium fluoride should be used. Lead makes a very suitable cathode element; but other metals are applicable.

Due to the high contact resistance of the electrolyte in the form described and the impregnated spacer suspending and maintaining the electrolyte in even distribution over the electrode surfaces, the resistance is of uniform value over the surfaces and there is no tendency to current discharge localization and hence a breakdown of the device, as occurs with the liquid type couples of the prior art.

For a better understanding of the invention reference is made to an embodiment thereof as illustrated by the accompanying drawing of a device particularly adapted as a lightning arrester, in which 1 and 2 represent the aluminum electrodes separated by a paper spacer impregnated with an electrolyte composed of a crystalline compound of borax, boric acid and glycerin, 3. The areas of the electrodes contacting with the electrolyte are coated by a high resistance film formed by a reaction between the two elements. The electrode terminals are represented at 4 and 5.

While the invention has been described specifically for use as a lightning arrester, it is capable of use wherever polarized couples are applicable, for example, as electrostatic condensers.

What I claim is:

1. In a polarized electrically conductive couple, the combination with polarized aluminium electrodes, of a spacer positioned between the electrodes and composed of a fibrous sheet material impregnated with a mixture of a crystallized film-maintaining electrolyte containing boric acid and borax crystals and acting as a suspension medium for the electrolyte.

2. In a polarized electrically conductive couple, the combination with film-forming electrodes, of a spacer positioned between the electrodes and composed of a cellulose material impregnated with a mixture of a crystallized electrolyte containing boric acid and a neutral salt thereof and acting as a suspension medium for the electrolyte.

3. In a polarized electrically conductive couple, the combination with film-forming electrodes, of a spacer positioned between the electrodes and composed of a cellulose material impregnated with a mixture of a crystallized electrolyte containing borax crystals and boric acid and acting as a suspension medium for the electrolyte.

4. In a polarized electrically conductive couple, the combination with film-forming electrodes, of a spacer positioned between the electrodes and composed of a cellulose material impregnated with a mixture of a film-maintaining crystallized electrolyte containing boric acid and a salt thereof, the spacer acting as a suspension medium for the mixture.

5. In a polarized electrically conductive couple, the combination with polarized aluminum electrodes, of a spacer positioned between the electrodes and composed of a cellulose material impregnated with an acidified film-maintaining electrolyte containing a crystallized mixture of boric acid crystals and crystals of a salt thereof.

6. In a polarized electrically conducting couple, the combination with film-forming electrodes, of a spacer positioned between the electrodes and composed of a cellulose material impregnated with a mixture of a film-forming crystallized electrolyte containing boric acid crystals and borax crystals with a relatively small amount of glycerin and water.

7. In a polarized electrolytic conductive couple the combination with film-forming electrodes, of a crystallized electrolyte comprising the products resulting from heating to a temperature of about 90° C. a mixture including a glycerol, boric acid and a borate.

8. In a polarized electrolytic conductive couple the combination with film-forming electrodes, of a spacer positioned between said electrodes impregnated with a crystallized electrolyte comprising the products resulting from heating to a temperature of about 90° C. a mixture including a glycerol, boric acid and a borate.

9. A crystallized electrolyte for a polarized electrolytic conductive couple, comprising the products resulting from heating to a temperature of about 90° C. a mixture including a glycerol, boric acid and a borate.

10. A crystallized electrolyte for a polarized electrolytic conductive couple, including the products resulting from heating to a temperature of about 200° F. a mixture of boric acid, a salt thereof and glycerin.

Signed at the city of New York in the county of New York and State of New York this 17th day of June A. D. 1927.

SAMUEL RUBEN.